Figure 1:
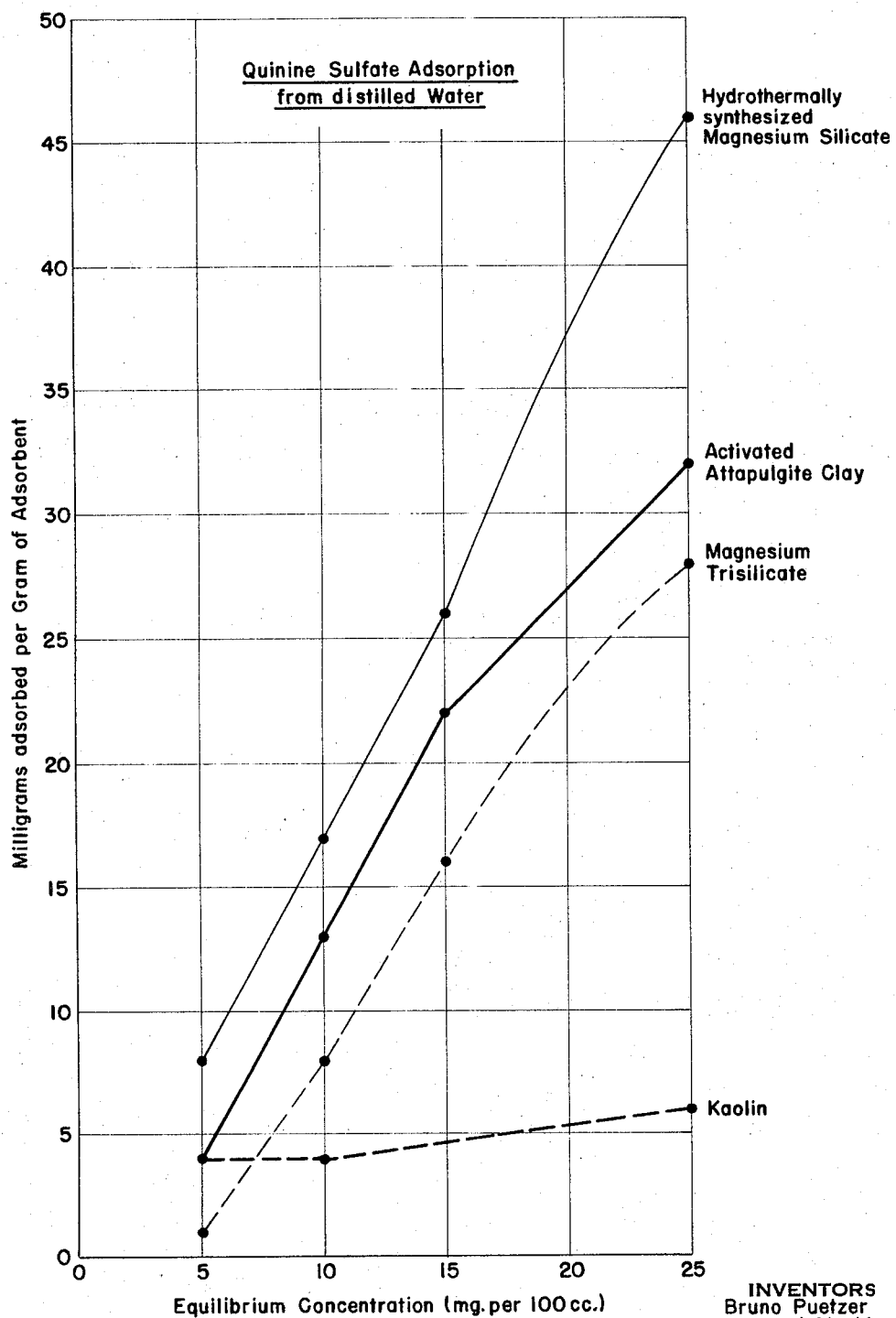
Figure 2:
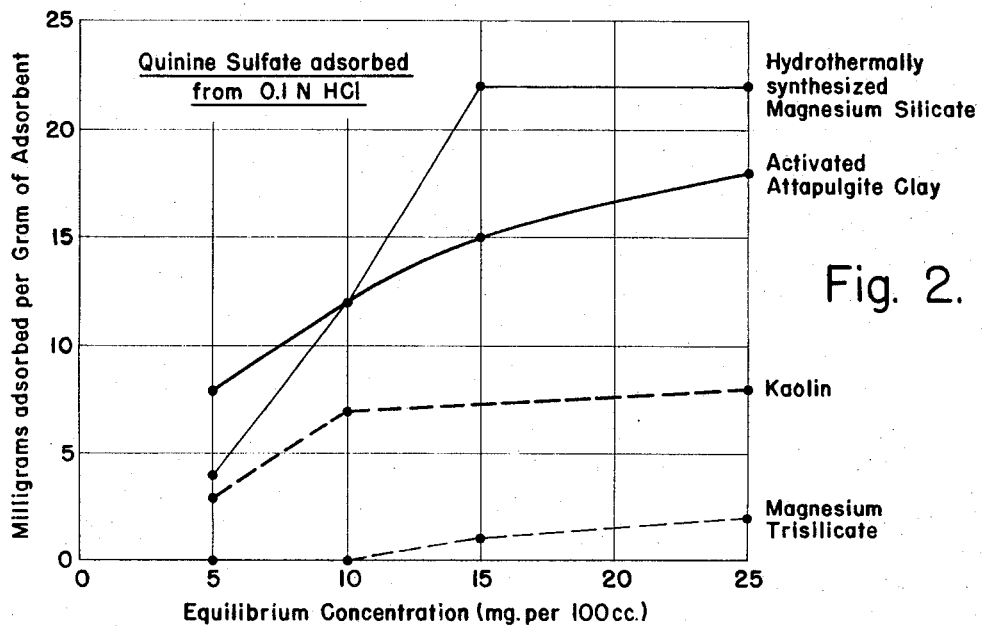
Figure 3:
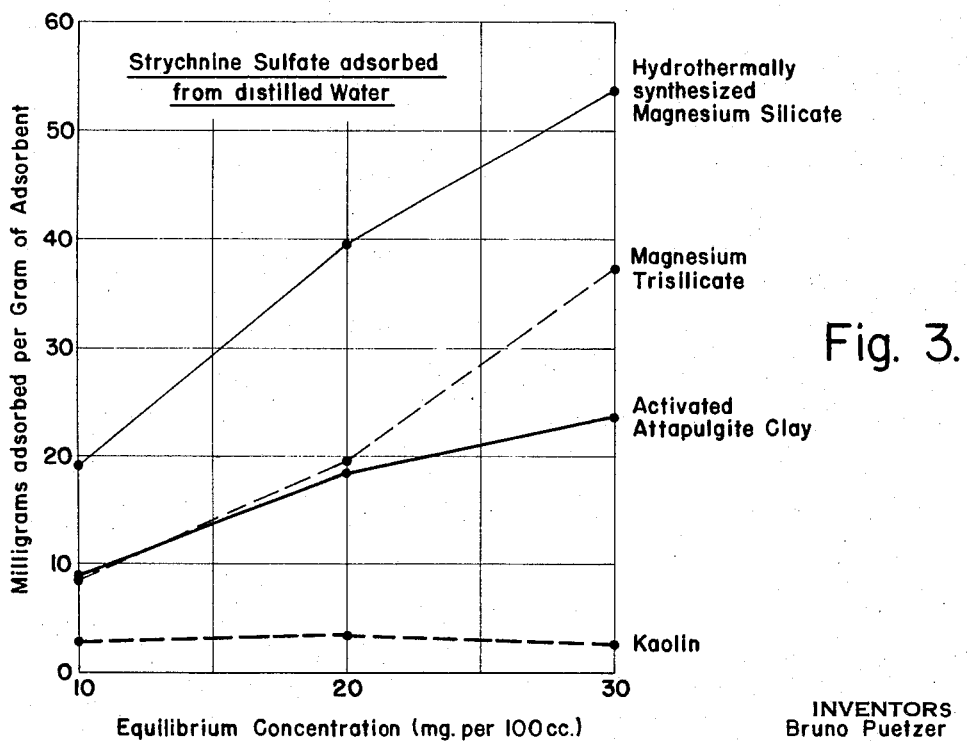

United States Patent Office 3,352,752
Patented Nov. 14, 1967

3,352,752
INTESTINAL ADSORBENT COMPOSITIONS
Bruno Puetzer, White Plains, Leonard Mackles, New York, and Alexander V. Finn, Ozone Park, N.Y., assignors, by mesne assignments, to Tintex Corporation, c/o Revlon, Inc., New York, N.Y., a corporation of Delaware
Filed July 25, 1963, Ser. No. 297,544
17 Claims. (Cl. 167—55)

This invention relates, in general, to therapeutic compositions suitable for the treatment of certain disorders in the gastrointestinal system. More particularly, the invention is concerned with the treatment of those disorders of the gastrointestinal system attributable to the presence of certain distress-causing substances and contemplates, in its broadest aspects, relief from such disorders through the use of therapeutic compositions containing an intestinal adsorbent. In a more specific sense, the invention relates to novel and unique therapeutic compositions containing an intestinal adsorbent having an unusual capacity and affinity for many types of distress-causing substances often found or produced in the gastrointestinal system.

It is well known that substances such as bacteria toxins, food toxins, and various by-products of the digestive process, as well as toxic alkaloids are the causes of many disorders of the gastrointestinal system, such as dysentery, diarrhea, enteritis, colitis, gastritis, excessive intestinal fermentation and other similar intestinal disturbances and intoxications. Treatment of such disorders is, for the most part, based on the finding that many of the causative agents responsible for such disorders are adsorbed by certain innocuous clays. In therapeutic practice, these clays are administered in the form of a tablet or liquid suspension and passed through the gastrointestinal tract in much the same manner as nonirritating bulk substances. Thus, relief is obtained by removal of the causative agents from the gastrointestinal system via the mechanism of adsorption and subsequent natural elimination, coupled, in the present instance, with a unique protective coating action of the intestinal tract, and a filtering mechanism which serves to mitigate or avoid absorption of toxins.

Various clays have been proposed for use as adsorbents in the treatment of gastric disorders. These clays, which are normally referred to as "intestinal adsorbents," generally comprise one or more of the naturally occurring hydrates and mixed hydrates of magnesium or aluminum silicate such as kalolin, halloysite and attapulgite. While these clays, particularly kaolin, are useful in the treatment of those disorders with which we are concerned, they have not proven entirely satisfactory in view of their somewhat limited adsorption capacity. Because the relief offered by the use of an effective intestinal adsorbent is potentially significant, considerable effort has been devoted toward the discovery of clays or similar materials having improved adsorption characteristics. Some of these efforts have resulted in the finding that heat or chemical treatment of naturally occurring clays improves their capacity to adsorb causative substances. Other efforts have resulted in the use of certain synthetic clays such as the precipitated hydrate of magnesium silicate. Although these efforts have been useful in expanding the usefulness of intestinal adsorbents, they have not fully met the widespread need for therapeutic compositions containing an intestinal adsorbent of unusual capacity.

The present invention is based, at least in part, upon our discovery that therapeutic compositions containing a hydrothermally synthesized magnesium silicate possess an unusual and highly effective capacity to adsorb certain bacteria toxins, food toxins, toxic alkaloids, and other distressing by-products of the digestive process. Our invention makes possible the treatment of disorders in the gastrointestinal system caused by the presence of such causative agents including, for example, toxic alkaloids such as quinine sulfate and strychnine sulfate, and typical toxic bacteria such as *Staphylococcus aureus, Salmonella typhimurium, Shigella dispar, Proteus morganii, Shigella dysenteriae, Salmonella montevideo, Micrococcus pyogenes* var. *aureus,* and the like or by the presence of bacteria introduced through toxic foods, such as, *S. enteritidis, S. typhimurium* and *S. poratyphi,* or by the presence of common by-products of the digestive process.

The hydrothermally synthesized magnesium silicates which we employ as the intestinal adsorbent in the therapeutic compositions of our invention are prepared by reacting magnesium oxide with silica in the presence of water at elevated temperatures. Commercial processes for the production of suitable magnesium silicates are somewhat similar, generally differing only with respect to the temperature employed and the ratio of reactants and, in general, these involve the steps of first forming a thin slurry of the reactants, heating this slurry in an autoclave, and thereafter recovering the desired magnesium silicate from the reacted slurry by a series of filtering and drying procedures.

Significantly, the magnesium silicates utilized in the compositions of the invention are "reaction products" of a hydrothermal mechanism, as distinguished from similar chemical entities recoverable through normal precipitation techniques. Thus, hydrothermally synthesized magnesium silicates differ from the poorly defined natural magnesium silicates as well as from those prepared by precipitation techniques in terms of empirical composition as well as in terms of an unusual capacity to adsorb many distress-causing substances often produced in the gastrointestinal system. In terms of physical properties, hydrothermally synthesized magnesium silicates are produced in the form of finely-divided powders having unique particle structures ranging from almost round to needlelike in shape and characterized by surface areas from about 48 to over 200 square meters per gram. One commercially-available hydrothermally synthesized magnesium silicate that we have found especially useful in our therapeutic compositions is supplied by Johns-Manville Inc. under the trademark "Celkate T–21." The chemical composition of "Celkate T–21" appears in the table below.

TABLE A

| Constituent: | Percent by weight |
|---|---|
| Silica ($SiO_2$) | 66.4 |
| Lime (CaO) | 1.0 |
| Alumina ($Al_2O_3$) | 4.3 |
| Iron oxide ($Fe_2O_3$) | 1.6 |
| Magnesia (MgO) | 16.6 |
| Alkalies ($Na_2O + K_2O$) | 1.0 |
| Ignition loss | 9.1 |

Typical physical properties of "Celkate T–21" appear in the following table.

TABLE B

| Physical property: | Value |
|---|---|
| Bulk density (lbs. per cu. ft.) | 13.50 |
| 325 mesh retention (weight percent) | 2.00 |
| pH, 10% water slurry | 7.60 |
| Moisture (weight percent) | 3.00 |
| Surface area (sq. meters per gram) | 180.00 |
| Specific gravity | 2.41 |
| Refractive index | 1.54 |
| Avg. particle size (microns) | 2.6 |

The unique capacity of the therapeutic compositions of our invention to adsorb many of the distress-causing substances found in the gastrointestinal system is perhaps best illustrated by referring to a series of comparative studies made with respect to the intestinal adsorbent we employ as an essential ingredient of our novel compositions and well-known materials presently employed for this purpose. These studies were carried out to determine the capacity of a material to adsorb such discomfort and distress-causing substances as bacteria toxins, food toxins, various by-products of the digestive process and toxic alkaloids from aqueous solutions and are based upon established procedures for simulating conditions often found in the gastrointestinal system.

There appears in Table I below, a tabulation of the data obtained when studying the adsorptive capacity of hydrothermally synthesized magnesium silicate, kaolin, activated attapulgite clay and magnesium trisilicate (precipitated) with respect to a toxic alkaloid, specifically quinine sulfate, dissolved in distilled water having a pH of 6.8. This study was carried out by adding one-half (0.5) gram of an adsorbent to each of four aqueous solutions containing differing concentrations of quinine sulfate. The resulting mixtures were then agitated at ten (10) minute intervals for a period of about one (1) hour and subsequently subjected to the action of a centrifuge to produce a solids phase (adsorbent) and a liquid phase which comprised water and unadsorbed quinine sulfate. At this point the percent of light, having a wave length of 345 milimicrons, transmited (percent transmission) through the liquid phase was recorded on a Bauch and Lomb Spectronic 20 Colorimeter-Spectrophotometer. With this value and using standard curves) graphs obtained by plotting percent transmission at wave lengths of light transmitted for given aqueous concentrations of quinine sulfate) the amount of quinine sulfate remaining in the liquid phase was readily determined. The amount of quinine sulfate adsorbed by the adsorbent is obtained as the difference between the amount added to the original solution and the amount present in the liquid phase. The data obtained are as follows:

TABLE I

| Mgs. Quinine Sulfate per 100 cc. distilled water | Mgs. of Quinine Sulfate Adsorbed | | | |
|---|---|---|---|---|
| | Kaolin, 0.5 g. | Magnesium Trisilicate, 0.5 g. | Activated Attapulgite Clay, 0.5 g. | Hydrothermally Synthesized Magnesium Silicate, 0.5 g. |
| 5 | 2.0 | 0.5 | 2.0 | 4.0 |
| 10 | 2.0 | 4.0 | 6.5 | 8.5 |
| 15 | 0.5 | 8.0 | 11.0 | 13.0 |
| 25 | 3.0 | 14.0 | 16.0 | 23.0 |

The above results of this study clearly show that hydrothermally synthesized magnesium silicate is characterized by a considerably greater capacity to adsorb quinine sulfate from aqueous solutions than kaolin, magnesium trisilicate, and activated attapulgite clay. These results are better illustrated by reference to FIGURE I which represents a graph of a plot of milligrams of quinine sulfate adsorbed per gram of adsorbent against the equilibrium concentration (mg. per 100 cc.) of the various mixtures.

In a comparable study, the capacity of hydrothermally synthesized magnesium silicate, kaolin, magnesium trisilicate and activated atapulgite clay to adsorb quinine sulfate from aqueous acid solutions was determined by procedures similar to those described above with the exception that a 0.1 N hydrogen chloride solution was substituted for distilled water. Readings of percent transmission were made with light having a wave length of 375 millimicrons. The data obtained appear in Table II.

TABLE II

| Mgs. Quinine Sulfate per 100 cc. 0.1 N HCl solution | Mgs. of Quinine Sulfate Adsorbed | | | |
|---|---|---|---|---|
| | Kaolin, 0.5 g. | Magnesium Trisilicate, 0.5 g. | Activated Attapulgite Clay, 0.5 g. | Hydrothermally Synthesized Magnesium Silicate, 0.5 g. |
| 5 | 1.5 | 0.0 | 2.0 | 4.0 |
| 10 | 3.5 | 0.0 | 6.0 | 6.0 |
| 15 | 2.0 | 0.5 | 7.5 | 11.0 |
| 25 | 4.0 | 1.0 | 9.0 | 11.0 |

These data show that hydrothermally synthesized magnesium silicate possesses a greater capacity to adsorb quinine sulfate from acid solutions thereof than any of the conventional materials studied. The results are graphically illustrated in FIGURE II which represents a plot of milligrams of quinine sulfate adsorbed per gram of adsorbent against the equilibrium concentrations (mg./100 cc.) of the various mixtures.

Another portion of our study with respect to the capacity of hydrothermally synthesized magnesium silicate and other materials to adsorb alkaloids was carried out with distilled water solutions of strychnine sulfate. Because of the lower wave lengths required for strychnine sulfate analysis, the percent of light transmission was obtained at a wave length of 245 millimicrons on a Beckman DU Spectometer. In all other respects the procedure followed was identical with that employed in our work with distilled water solutions of quinine sulfate. The data obtained appear in the table below.

TABLE III

| Mgs. Strychnine Sulfate per 100 cc. distilled water | Mgs. of Quinine Sulfate Adsorbed | | | |
|---|---|---|---|---|
| | Kaolin, 0.5 g. | Magnesium Trisilicate, 0.5 g. | Activated Attapulgite Clay, 0.5 g. | Hydrothermally Synthesized Magnesium Silicate, 0.5 g. |
| 10 | 1.45 | 4.33 | 4.42 | 9.67 |
| 20 | 1.75 | 9.84 | 9.30 | 19.32 |
| 30 | 1.29 | 18.69 | 11.83 | 26.93 |

The considerably greater capacity of hydrothermally synthesized magnesium silicate, as compared with the other materials studied, to adsorb strychnine sulfate from distilled water solutions is apparent from the data given above. This greater capacity is graphically illustrated in the graph shown in FIGURE III which represents a plot of milligrams of strychnine sulfate adsorbed per gram of adsorbent against the equilibrium concentration (mg./100 cc.) of the various mixtures.

Our studies with respect to the capacity of hydrothermally synthesized magnesium silicate and other materials to adsorb bacteria of the type known to cause enteric discomfort or distress were carried out in accordance with the method developed by Martin Barr as described in his article entitled, "Adsorption Studies on Clays II," appearing in the Journal of the American Pharmaceutical Association, volume XLVI, No. 8, August 1957. In brief, the method as described calls for the addition of a microorganism to a sterile, capped vessel containing a precise amount of adsorbent which had been previously sterilized in the vessel by a heat treatment carried out, at 160° C. for two hours. The suspension is prepared by adding small amounts of purified, sterile water to a vessel containing a twenty-four (24) hour growth of the microorganism on veal agar. The suspension-adsorbent mixture which has a pH of 6.8±1, is then shaken for thirty (30) minutes and thereafter allowed to stand for a period of three (3) hours to permit the adsorbent to settle. At this point the supernatant is removed with a pipet and placed in a separate sterile vessel and shaken to provide a uniform dispersion of the bacteria. A bacterial count is then carried out on one milliliter of supernatant taken from the dispersion, by the standard colony count procedure for quantitative determination of microorganisms in water as set forth in "Standard Methods for the Determination of Water and Sewage," Eighth Edition, American Public Health Association, New York, 1936. The number of bacteria adsorbed by the adsorbent is obtained as the difference between the bacterial counts in supernatant of the suspension-adsorbent mixture and a control suspension (free of adsorbent). In our work we employed *Micrococcus pyogenes* var. *aureus* as the species of bacteria and hydrothermally synthesized magnesium silicate and activated attapulgite clay as the adsorbents. Our data appear in the tables below.

TABLE IV

| Mg. Hydrothermal Synthesized in 5 ml. of suspension | Bacteria in 1 ml. suspension | Bacteria in 1 ml. supernatant | Bacteria Reduction | Percent Reduction or Adsorption |
|---|---|---|---|---|
| 0 (control) | $1.60 \times 10^8$ | | | |
| 10 | $1.60 \times 10^8$ | $8.0 \times 10^7$ | $0.80 \times 10^8$ | 50.0 |
| 20 | $1.60 \times 10^8$ | $4.5 \times 10^7$ | $1.15 \times 10^8$ | 71.9 |
| 50 | $1.60 \times 10^8$ | $4.5 \times 10^6$ | $1.56 \times 10^8$ | 97.5 |
| 100 | $1.60 \times 10^8$ | $1.3 \times 10^6$ | $1.59 \times 10^8$ | 99.4 |

TABLE V

| Mg. Activated Attapulgite Clay in 5 ml. of suspension | Bacteria in 1 ml. suspension | Bacteria in 1 ml. supernatant | Bacterial Reduction | Percent Reduction or Adsorption |
|---|---|---|---|---|
| 0 (control) | $1.60 \times 10^8$ | | | |
| 10 | $1.60 \times 10^8$ | $1.00 \times 10^8$ | $0.60 \times 10^8$ | 37.5 |
| 20 | $1.60 \times 10^8$ | | | |
| 50 | $1.60 \times 10^8$ | $1.80 \times 10^7$ | $1.42 \times 10^8$ | 88.5 |
| 100 | $1.60 \times 10^8$ | $9.60 \times 10^6$ | $1.50 \times 10^8$ | 94.0 |

A comparison of the data obtained illustrates the greater capacity of hydrothermally synthesized magnesium silicate, as compared to activated attapulgite clay, to adsorb *Micrococcus pyogenes* var. *aureus* from aqueous solutions thereof. This greater capacity is more dramatically shown by the graph of FIGURE IV wherein the percent reduction in bacterial count is plotted against the concentration of the adsorbent.

One particularly advantageous property of the therapeutic compositions of our invention is the relative inertness of hydrothermally synthesized magnesium silicate to the action of acids. This property is of significant importance inasmuch as it insures the continued capacity of our composition to adsorb foreign substances under the acidic conditions which characterize, in part, the gastrointestinal system. In our work we determined the extent to which hydrothermally synthesized magnesium silicate and several conventional adsorbents react with acids by carrying out a series of titrations in accordance with the method described as "Procedure B" in the article entitled "A Study of Antacids" by Dale and Booth appearing in the Journal of the American Pharmaceutical Association, volume XLIV, No. 3, March 1955. In brief, these titrations were carried out on two (2) gram samples of the adsorbents by adding given quantities of a 0.1 N solution of hydrogen chloride over predetermined periods of time. The data obtained appear in the table below.

TABLE VI.—LOGARITHM OF RECIPROCAL OF HYDROGEN ION CONCENTRATION (pH)

| Time (min.) | Milliliters, 0.1 N HCl | Activated Attapulgite Clay | Hydrothermally Synthesized Magnesium Silicate | Kaolin | Magnesium Trisilicate |
|---|---|---|---|---|---|
| 0 | 50 | | | | |
| 1 | | 2.50 | 1.70 | 1.15 | 5.10 |
| 3 | | 2.10 | 1.70 | 1.10 | 6.10 |
| 5 | | 2.10 | 1.80 | 1.10 | 6.33 |
| 10 | | 2.20 | 1.80 | 1.18 | 6.58 |
| 20 | 70 | 2.05 | 1.30 | 1.13 | 6.50 |
| 30 | 90 | 1.91 | 1.23 | 1.19 | 6.30 |
| 40 | 110 | 1.39 | 1.28 | 1.19 | 6.21 |
| 50 | 130 | 1.38 | 1.22 | 1.20 | 6.23 |
| 60 | 150 | 1.31 | 1.21 | 1.20 | 6.09 |
| 70 | 170 | 1.30 | 1.21 | 1.20 | 5.51 |
| 80 | 190 | 1.30 | 1.21 | 1.20 | 3.21 |
| 90 | 210 | 1.30 | 1.21 | 1.19 | 2.49 |
| 100 | 230 | 1.30 | 1.21 | | 2.12 |
| 110 | 250 | 1.30 | 1.24 | | 1.99 |
| 120 | 270 | 1.30 | 1.24 | | |
| 130 | 290 | 1.24 | 1.24 | | |
| 140 | 310 | 1.29 | 1.24 | | |
| 150 | 330 | 1.30 | 1.24 | | |

Figure 5:
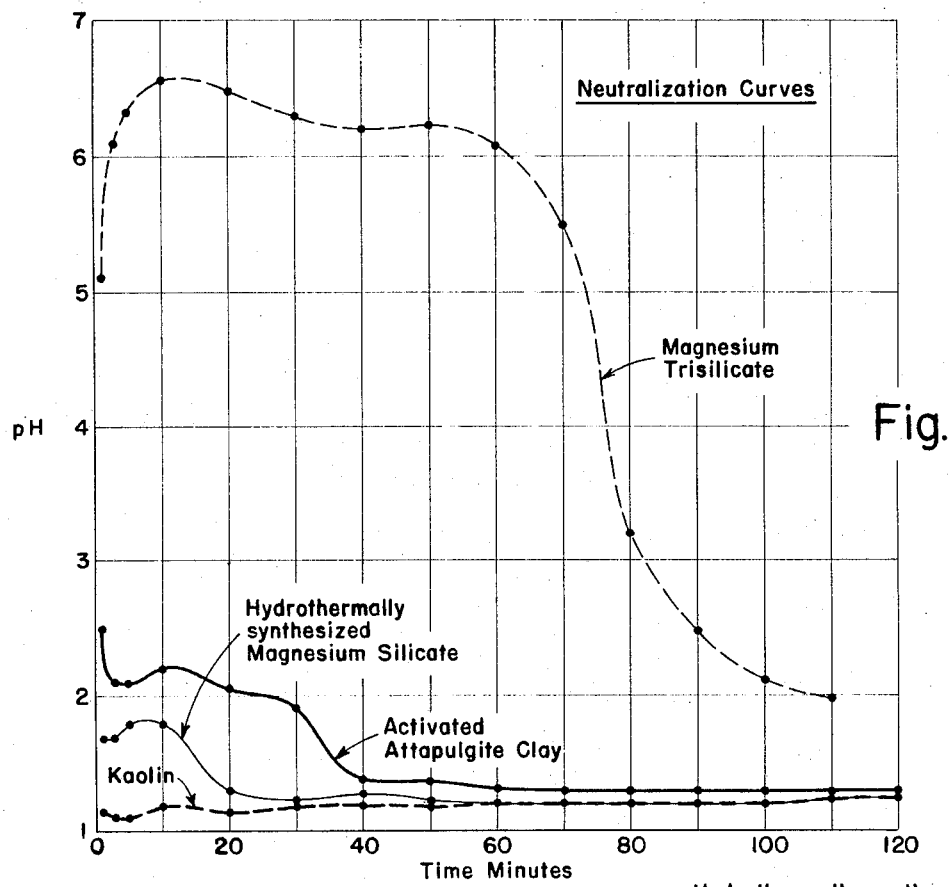
Figure 4:
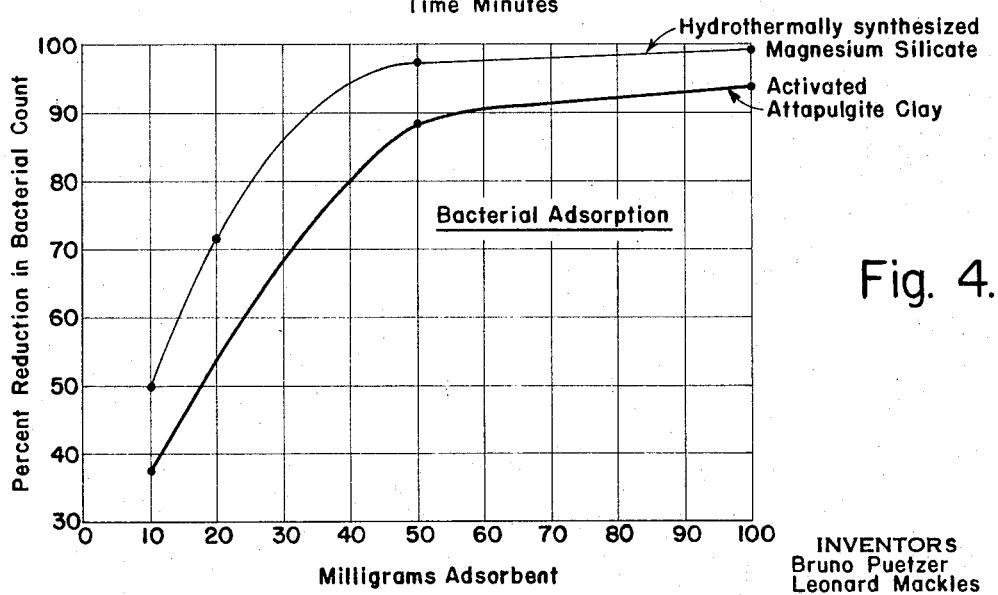

The above data illustrate, as well as FIG. 5, the relative inertness of hydrothermally synthesized magnesium silicate to acids over a period of two and one-half hours. While kaolin is somewhat less inert under these conditions, its relatively poor performance as an adsorbent for bacteria and alkaloids, for example, stresses the widespread need for the therapeutic compositions of our invention. An excellent illustration of the outstanding performance of hydrothermally synthesized magnesium silicate as an intestinal adsorbent can be had by reference to Table II, where it is shown that this form of magnesium silicate possesses a markedly superior capacity to adsorb a toxic alkaloid under these same acidic conditions.

Our novel compositions may also contain other active ingredients which exhibit therapeutic activity in their own right and thereby provide various embodiments of the present invention capable of multifunctional utility in the treatment of gastrointestinal disorders. One class of active ingredients which we have found most advantageous to incorporate within our therapeutic compositions are those alkaline agents generally referred to as "antacids" which serve to alleviate discomfort caused by the hyperacidity of certain gastric fluids. Typical of these antacids are alumina gel, magnesium hydroxide, magnesium oxide, calcium carbonate, sodium bicarbonate, sodium carboxymethylcellulose, and the like. Another class of active ingredients which we have employed in comibnation with hydrothermally synthesized magnesium silicate in the preparation of our therapeutic compositions are the antibiotics, particularly neomycin, polymyxin and their conventional salts as well as similar materials which are active against gram-positive and gram-negative bacteria. The antispasmodic agents, such as belladonna and homotropine methyl bromides, and sedatives, such as phenobarbital, constitute other classes of active ingredients that we have employed in combination with hydrothermally synthesized magnesium silicate to provide additional relief from distress of the gastrointestinal system. Pectin and sulfaguanidine are also suggested as extremely useful additives to our novel compositions in view of their known therapeutic activity.

The therapeutic compositions of this invention are intended for oral administration and, to this end, they may take various physical forms as for example, liquid suspensions, gels, powders, tablets and capsules. Preparation of our therapeutic compositions may be accomplished by various admixing procedures, well known in the art, which are appropriate for the physical form desired. Depending on the particular physical form selected, it will be oftentimes desirable to add ingredients of the non-therapeutic type which serve conveniently to adapt our novel compositions for a specific use. By way of illustration, preservatives such as sodium benzoate and sorbic acid as well as many of the parabens are generally employed when preparing aqueous liquid suspensions of our compositions. Additionally, suspending agents such as colloidal magnesium aluminum silicate (a product sold under the tradename "Veegum HV" by the Vanderbilt Company), emulsifying agents such as the polyalkene oxide derivatives of alcohols and dispersing agents assist in the preparation of one or more of the physical forms in which our therapeutic compositions can be produced. In the preparation of tablets, the use of one or more binders and lubricants is suggested to provide proper characteristics. Flavoring agents such as sorbitol and citric acid, and coloring agents can also be employed to render our compositions more appealing should such be deemed necessary in their administration to those who have aversion to medication.

The amount of hydrothermally synthesized magnesium silicate present in our therapeutic compositions is not narrowly critical and can vary over a wide range. For best results, we have found that these compositions should contain at least five (5) percent by weight of hydrothermally synthesized magnesium silicate, based on the total weight of the therapeutic composition. When our compositions are in the form of liquid suspensions, it is preferred that the amount of hydrothermally synthesized magnesium silicate present therein does not exceed about 28 percent by weight of the total mixture as otherwise the therapeutic composition will become too viscous to pour. The amount of active ingredients which exhibit therapeutic activity, such as antacids, antibiotics, analgesics (aspirin), antispasmodics and sedatives and the like, that can be incorporated with our novel compositions can vary over the ranges in which they are generally employed for their intended purposes. Likewise, those non-therapeutic additives, such as preservatives, suspending agents, dispersing agents and the like, can be employed in amounts consistent with the specific functions they serve.

Our invention may be best understood by reference to the specific examples presented hereinafter as well as to the suggested applications and dosages associated with the relatively large variety of therapeutic compositions described therein.

EXAMPLE I

A therapeutic composition in the form of a liquid suspension was prepared with the following ingredients:

| | Percent |
|---|---|
| Hydrothermally synthesized magnesium silicate | 14.00 |
| Sorbitol | 10.00 |
| CMC 7 LP (sodium carboxymethyl cellulose) | 0.60 |
| Saccharine | 0.085 |
| Methyl paraben (methyl para-hydroxybenzoate) | 0.20 |
| Citric acid | 0.10 |
| Veegum HV (complex of colloidal magnesium aluminum silicate) | 1.10 |
| Flavor, q.s. | |
| Color, q.s. | |
| Distilled water, q.s. to 100 percent. | |

All percentages are on a weight per volume basis. Since each fluid ounce (30 cc.) contains 4.2 grams of hydrothermally synthesized magnesium silicate, an average single dose of about two (2) tablespoonfuls is suggested for treatment of distress in the gastrointestinal system caused by the presence of a toxicant. A similar composition in which an equivalent amount of kaolin was substituted for the hydrothermally synthesized magnesium silicate, was found less effective in adsorbing similar toxicants.

EXAMPLE II

Another therapeutic composition in the form of a liquid suspension was prepared with the following ingredients:

| | Percent |
|---|---|
| Hydrothermally synthesized magnesium silicate | 14.00 |
| Sorbitol | 10.00 |
| CMC 7 LP (sodium carboxymethyl cellulose) | 0.50 |
| Saccharine | 0.085 |
| Methyl paraben (methyl para-hydroxybenzoate) | 0.20 |
| Pectin | 1.00 |
| Flavor, q.s. | |
| Color, q.s. | |
| Distilled water, q.s. to 100 percent. | |

As in Example I, all percentages are on a weight per volume basis. Since each fluid ounce (30 cc.) contains 4.2 grams of hydrothermally synthesized magnesium silicate and 0.3 gram of pectin, an average single dose of about two (2) tablespoonfuls is suggested for treatment of distress in the gastrointestinal system caused by the presence of toxicants. Comparable compositions in which magnesium tri-silicate or activated attapulgite clay is substituted in similar amounts for the hydrothermally synthesized magnesium silicate, was found to be less effective in adsorbing similar toxicants.

EXAMPLE III

A therapeutic composition in the form of a liquid suspension which contained hydrothermally synthesized magnesium silicate and an antibiotic was prepared with the ingredients listed below. All percentages are on a weight per volume basis.

| | Percent |
|---|---|
| Hydrothermally synthesized magnesium silicate | 7.00 |
| Sorbitol | 10.00 |
| CMC 7 LP (sodium carboxymethyl cellulose) | 0.50 |
| Saccharine | 0.085 |
| Methyl paraben (methyl para-hydroxybenzoate) | 0.20 |
| Pectin | 0.50 |
| Neomycin sulfate | 0.50 |
| Flavor, q.s. | |
| Color, q.s. | |
| Distilled water, q.s. to 100 percent. | |

Each fluid ounce (30 cc.) of this composition contains 2.1 grams of hydrothermally synthesized magnesium silicate, 0.15 gram pectin and 0.15 gram neomycin sulfate. An average single dose of from about two (2) to four (4) tablespoonfuls is recommended in the multifunctional treatment of distress in the gastrointestinal system caused by the presence of certain gram-positive bacteria and other intestinal toxicants.

EXAMPLE IV

The multifunctional treatment of distress in the gastrointestinal system due to the presence of gram-negative bacteria can be effectively accomplished by substituting for the neomycin sulfate of the therapeutic composition described in Example III, 0.0265% (weight-volume basis) of polymyxin B sulfate. Since each fluid ounce (30 cc.) of this composition contains 2.1 grams of hydrothermally synthesized magnesium silicate, 0.15 gram of pectin and 0.00795 gram polymyxin B sulfate, an average single dose of from about two (2) to about four (4) tablespoonfuls is recommended.

EXAMPLE V

A therapeutic composition in the form of a liquid suspension which contained hydrothermally synthesized magnesium silicate and an antispasmodic agent was prepared with the ingredients listed below:

| | Percent |
|---|---|
| Hydrothermally synthesized magnesium silicate | 5.00 |
| Sorbitol | 10.00 |
| CMC 7 LP (sodium carboxymethyl cellulose) | 0.50 |
| Saccharine | 0.085 |
| Methyl paraben (methyl para-hydroxybenzoate) | 0.20 |
| Pectin | 0.35 |
| Belladonna leaf extract | 0.012 |

Flavor, q.s.
Color, q.s.
Distilled water, q.s. to 100 percent.

All percentages are on a weight volume basis.

Each fluid ounce (30 cc.) contains 1.5 grams of hydrothermally synthesized magnesium silicate, 0.105 gram of pectin and 0.0036 gram of belladonna leaf extract. Dosages of from about two (2) to six (6) tablespoonfuls are suggested for treatment of distress in the gastrointestinal system caused by the presence of intestinal toxicants.

EXAMPLE VI

Another therapeutic composition containing an antispasmodic agent was prepared with the ingredients contained in the composition of Example V with the exception that 0.020% (weight-volume basis) homatropine methylbromide was substituted for the belladonna leaf extract. Each fluid ounce of this composition contains 1.5 grams of hydrothermally synthesized magnesium silicate, 0.105 gram of pectin and 0.006 gram of homatropine methyl bromide and dosages of from about two (2) to four (4) tablespoons are recommended in the treatment of distress in the gastrointestinal system caused by the presence of intensial toxicants.

EXAMPLE VII

A therapeutic composition in the form of a liquid suspension containing hydrothermally synthesized magnesium silicate and a sedative was prepared with the following ingredients:

| | Percent |
|---|---|
| Hydrothermally synthesized magnesium silicate | 20.00 |
| Sorbitol | 10.00 |
| CMC 7 LP (sodium carboxymethyl cellulose) | 0.50 |
| Saccharine | 0.085 |
| Methyl paraben (methyl para-hydroxybenzoate) | 0.20 |
| Pectin | 1.50 |
| Phenobarbital | 0.08 |

Flavor, q.s.
Color, q.s.
Distilled water, q.s. to 100 percent.

All percentages are on a weight per volume basis.

Each fluid ounce (30 cc.) of this composition contains 6 grams of hydrothermally synthesized magnesium silicate, 0.45 gram of pectin and 0.025 gram of phenobarbital. An average dose of about one tablespoon is recommended in the treatment of distress in the gastrointestial system caused by the presence of certain species of bacteria and other intestial toxicants. This composition illustrates the unique ability of the compositions of the invention to effect the elimination of bacterial toxins by an adsorption mechanism as contrasted with the destructive action of those compositions which also contain an antibiotic additive, for example.

EXAMPLE VIII

A therapeutic composition in the form of a liquid suspension containing hydrothermally synthesized magnesium silicate and an antacid was prepared with the ingredients listed below.

| | Percent |
|---|---|
| Hydrothermally synthesized magnesium silicate | 14.00 |
| Sorbitol | 10.00 |
| CMC 7 LP (sodium carboxymethyl cellulose) | 0.50 |
| Saccharine | 0.085 |
| Methyl paraben (methyl para-hydroxybenzoate) | 0.20 |
| Pectin | 1.00 |
| Aluminum hydroxide dried gel | 2.20 |

Flavor, q.s.
Color, q.s.
Distilled water, q.s. to 100 percent.

All percentages are on a weight per volume basis.

Each fluid ounce (30 cc.) contains 4.2 grams of hydrothermally synthesized magnesium silicate, 0.3 gram of pectin and 0.66 gram of aluminum hydroxide dried gel. An average single dose of about two (2) tablespoons is suggested for discomfort of and distress in the gastrointestinal system caused by hyperacidity as well as by the presence of bacteria toxicants, toxic alkaloids and other intestinal toxins.

EXAMPLE IX

Another therapeutic composition in the form of a liquid suspension containing hydrothermally synthesized magnesium silicate and an antacid was prepared with the ingredients employed in Example VIII with the exception that 1% (weight-volume basis) urea and 2.3% (weight-volume basis) calcium carbonate is substituted for the aluminum hydroxide gel. Citric acid in an amount of 0.100% (weight-volume basis) is also added. Each fluid ounce (30 cc.) contains 4.2 grams of hydrothermally synthesized magnesium silicate, 0.3 gram pectin, 0.3 gram urea and 0.69 gram calcium carbonate and an average single dose of about two (2) tablespoons is recommended for the treatment of distress and discomfort of the gastrointestinal system caused by hyperacidity and by the presence of intestinal toxicants.

EXAMPLE X

A therapeutic composition in the form of a liquid suspension was prepared with the following ingredients:

| | Percent |
|---|---|
| Hydrothermally synthesized magnesium silicate | 25.00 |
| Sorbitol | 10.00 |
| CMC 7 LP (sodium carboxymethyl cellulose) | 0.20 |
| Saccharine | 0.085 |
| Methyl paraben (methyl para-hydroxybenzoate) | 0.20 |
| Pectin | 1.50 |
| Sulfaguanidine | 5.00 |

Flavor, q.s.
Color, q.s.
Distilled water, q.s. to 100%.

Since each fluid ounce (30 cc.) contains 7.5 grams of hydrothermally synthesized magnesium silicate, 0.45 gram pectin and 1.50 grams sulfaguanidine, an average single dose of about one (1) tablespoon is recommended for the treatment of distress in the gastrointestinal system caused by the presence of intestinal toxicants.

EXAMPLE XI

A therapeutic composition in the form of tablets was prepared by compounding hydrothermally synthesized magnesium silicate with various lubricants and binders and compressing the resulting mixtures in the form of tablets. Tablets of the following compositions were prepared.

| Composition A: | Parts |
|---|---|
| Hydrothermally synthesized magnesium silicate | 100 |
| Starch | 5 |
| Composition B: | |
| Hydrothermally synthesized magnesium silicate | 100 |
| Pectin | 10 |
| Starch | 5 |

These tablets are extremely effective in adsorbing toxic alkaloids and certain bacteria from aqueous solutions.

EXAMPLE XII

Therapeutic compositions essentially identical to those of Examples III, IV, V, VII and X, with the exception that about 3% (weight-volume basis) of alumina gel was added, were prepared and found suitable in providing relief from discomfort caused by hyperacidity, as well as relief from distress caused by the presence of intestinal toxicants and certain bacteria, in the gastrointestinal system.

Having thus described the subject matter of our invention, what it is desired to secure by Letters Patent is:

1. A therapeutic composition for oral administration comprising an intestinal adsorbent which comprises at least five percent (5%) by weight of magnesium silicate, said magnesium silicate being finely divided and having a surface area of about 48 to over 200 square meters per gram and having been synthesized by reacting magnesium oxide with silica in the presence of water at an elevated temperature and subsequently filtering and drying the magnesium silicate, and pectin.

2. A therapeutic composition for oral administration comprising an intestinal adsorbent which comprises at least five percent (5%) by weight of magnesium silicate, said magnesium silicate being finely divided and having a surface area of about 48 to over 200 square meters per gram and having been synthesized by reacting magnesium oxide with silica in the presence of water at an elevated temperature and subsequently filtering and drying the magnesium silicate, and an antibiotic.

3. A therapeutic composition for oral administration comprising an intestinal adsorbent which comprises at least five percent (5%) by weight of magnesium silicate, said magnesium silicate being finely divided and having a surface area of about 48 to over 200 square meters per gram and having been synthesized by reacting magnesium oxide with silica in the presence of water at an elevated temperature and subsequently filtering and drying the magnesium silicate, and an antacid.

4. A therapeutic composition for oral administration comprising an intestinal adsorbent which comprises at least five percent (5%) by weight of magnesium silicate, said magnesium silicate being finely divided and having a surface area of about 48 to over 200 square meters per gram and having been synthesized by reacting magnesium oxide with silica in the presence of water at an elevated temperature and subsequently filtering and drying the magnesium silicate, and an antispasmodic agent.

5. A therapeutic composition for oral administration comprising an intestinal adsorbent which comprises at least five percent (5%) by weight of magnesium silicate, said magnesium silicate being finely divided and having a surface area of about 48 to over 200 square meters per gram and having been synthesized by reacting magnesium oxide with silica in the presence of water at an elevated temperature and subsequently filtering and drying the magnesium silicate, pectin and an antibiotic.

6. A therapeutic composition for oral administration comprising an intestinal adsorbent which comprises at least five percent (5%) by weight of magnesium silicate, said magnesium silicate being finely divided and having a surface area of about 48 to over 200 square meters per gram and having been synthesized by reacting magnesium oxide with silica in the presence of water at an elevated temperature and subsequently filtering and drying the magnesium silicate, pectin and an antispasmodic agent.

7. A therapeutic composition for oral administration comprising an intestinal adsorbent which comprises at least five percent (5%) by weight of magnesium silicate, said magnesium silicate being finely divided and having a surface area of about 48 to over 200 square meters per gram and having been synthesized by reacting magnesium oxide with silica in the presence of water at an elevated temperature and subsequently filtering and drying the magnesium silicate, pectin and an antacid.

8. A therapeutic composition for oral administration comprising an intestinal adsorbent which comprises at least five percent (5%) by weight of magnesium silicate, said magnesium silicate being finely divided and having a surface area of about 48 to over 200 square meters per gram and having been synthesized by reacting magnesium oxide with silica in the presence of water at an elevated temperature and subsequently filtering and drying the magnesium silicate, pectin and neomycin sulfate.

9. A therapeutic composition for oral administration comprising an intestinal adsorbent which comprises at least five percent (5%) by weight of magnesium silicate, said magnesium silicate being finely divided and having a surface area of about 48 to over 200 square meters per gram and having been synthesized by reacting magnesium oxide with silica in the presence of water at an elevated temperature and subsequently filtering and drying the magnesium silicate, and polymyxin B sulfate.

10. A therapeutic composition for oral administration comprising an intestinal adsorbent which comprises at least five percent (5%) by weight of magnesium silicate, said magnesium silicate being finely divided and having a surface area of about 48 to over 200 square meters per gram and having been synthesized by reacting magnesium oxide with silica in the presence of water at an elevated temperature and subsequently filtering and drying the magnesium silicate, and belladonna leaf extract.

11. A therapeutic composition for oral administration comprising an intestinal adsorbent which comprises at least five percent (5%) by weight of magnesium silicate, said magnesium silicate being finely divided and having a surface area of about 48 to over 200 square meters per gram and having been synthesized by reacting magnesium oxide with silica in the presence of water at an elevated temperature and subsequently filtering and drying the magnesium silicate, pectin and homatropine methyl bromide.

12. A therapeutic composition for oral administration comprising an intestinal adsorbent which comprises at least five percent (5%) by weight of magnesium silicate, said magnesium silicate being finely divided and having a surface area of about 48 to over 200 square meters per gram and having been synthesized by reacting magnesium oxide with silica in the presence of water at an elevated temperature and subsequently filtering and drying the magnesium silicate, pectin and alumina gel.

13. A therapeutic composition for oral administration comprising an intestinal adsorbent which comprises at least five percent (5%) by weight of magnesium silicate, said magnesium silicate being finely divided and having a surface area of about 48 to over 200 square meters per gram and having been synthesized by reacting magnesium oxide with silica in the presence of water at an elevated temperature and subsequently filtering and drying the magnesium silicate, pectin, alumina gel and sulfaguanidine.

14. A therapeutic composition for oral administration comprising an intestinal adsorbent which comprises at least five percent (5%) by weight of magnesium silicate, said magnesium silicate being finely divided and having a surface area of about 48 to over 200 square meters per gram and having been synthesized by reacting magnesium oxide with silica in the presence of water at an elevated temperature and subsequently filtering and drying the magnesium silicate, pectin, alumina gel and neomycin sulfate.

15. A therapeutic composition for oral administration comprising an intestinal adsorbent which comprises at least five percent (5%) by weight of magnesium silicate, said magnesium silicate being finely divided and having a surface area of about 48 to over 200 square meters per gram and having been synthesized by reacting magnesium oxide with silica in the presence of water at an elevated temperature and subsequently filtering and drying the magnesium silicate, pectin, alumina gel and polymyxin B sulfate.

16. A therapeutic composition for oral administration comprising an intestinal adsorbent which comprises at least five percent (5%) by weight of magnesium silicate, said magnesium silicate being finely divided and having a surface area of about 48 to over 200 square meters per gram and having been synthesized by reacting magnesium oxide with silica in the presence of water at an elevated temperature and subsequently filtering and drying the magnesium silicate, pectin, alumina gal and phenobarbital.

17. A therapeutic composition for oral administration comprising an intestinal adsorbent which comprises at least five percent (5%) by weight of magnesium silicate, said magnesium silicate being finely divided and having a surface area of about 48 to over 200 square meters per gram and having been synthesized by reacting magnesium oxide with silica in the presence of water at an elevated temperature and subsequently filtering and drying the magnesium silicate, pectin, alumina gel and belladonna leaf extract.

References Cited

UNITED STATES PATENTS

| | | | |
|---|---|---|---|
| 1,945,534 | 2/1934 | Rembert | 23—110 |
| 2,203,614 | 6/1940 | Goodwin | 23—110 |
| 2,498,353 | 2/1950 | Bierce | 23—110 |
| 2,650,203 | 8/1953 | Hawes | 23—110 |

FOREIGN PATENTS 666,992    7/1963    Canada.

OTHER REFERENCES

Fein—Modern Drug Encyclopedia—8th Ed., 1961, p. 640.

SAM ROSEN, *Primary Examiner*.